United States Patent [19]

Gaither et al.

[11] 4,432,053

[45] Feb. 14, 1984

[54] ADDRESS GENERATING APPARATUS AND METHOD

[75] Inventors: Blaine D. Gaither, Sierra Madre; William W. Farley, IV, Pasadena; Albert Johnson, Altadena; Brian L. Parker, Pasadena, all of Calif.

[73] Assignee: Burroughs Corporation, Detroit, Mich.

[21] Appl. No.: 278,155

[22] Filed: Jun. 29, 1981

[51] Int. Cl.³ .......................... G06F 7/00; G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,725,874 | 4/1973 | Van Heel | 364/200 |
| 3,786,436 | 1/1974 | Zelinski et al. | 364/200 |
| 3,902,163 | 8/1975 | Amdahl et al. | 364/200 |
| 3,938,096 | 2/1976 | Brown et al. | 364/200 |
| 4,057,848 | 11/1977 | Hayashi | 364/200 |
| 4,084,227 | 4/1978 | Bennett et al. | 364/200 |
| 4,117,536 | 9/1978 | Bodner | 364/200 |
| 4,128,875 | 12/1978 | Thurber et al. | 364/200 |
| 4,145,738 | 3/1979 | Inoue et al. | 364/200 |
| 4,155,119 | 5/1979 | De Ward et al. | 364/200 |
| 4,240,139 | 12/1980 | Fukuda et al. | 364/200 |
| 4,251,860 | 2/1981 | Mitchell et al. | 364/200 |
| 4,361,868 | 11/1982 | Kaplinsky | 364/200 |

OTHER PUBLICATIONS

IBM Tech. Discl. Bull., vol. 23, No. 5; Oct., 1980; pp. 1785-1789 "Storage Relocation Translator" by P.L. Martinez.

Computer Design; Aug. 1980; pp. 111-118; "Indexed Mapping Extends Microprocessor Addressing Range" by Ian LeMair.

IBM Tech. Discl. Bull. vol. 23, No. 6; Nov. 1980; pp. 2199-2200 "Relocation Translator Adress Bit Scheme" by P.L. Martinez.

Primary Examiner—Jerry Smith
Assistant Examiner—William G. Niessen
Attorney, Agent, or Firm—Nathan Cass; Kevin R. Peterson; David G. Rasmussen

[57] ABSTRACT

Address generating apparatus which uses narrow data paths for generating a wide logical address and which also provides for programs to access very large shared data structures outside their normally available addressing range. Selective indexed addressing is employed for providing both index data and variable dimension override data. During address generation, selected index data is used in conjunction with a displacement provided by an instruction for determining an offset. Dimension override data accompanying the selected index data is used to selectively access an address locating entry in a table of entries corresponding to the applicable program. The resulting accessed address locating entry is in turn used to determine the particular portion of memory against which the offset is to be applied.

8 Claims, 7 Drawing Figures

ADDRESS GENERATING APPARATUS AND METHOD

BACKGROUND OF THE INVENTION

This invention relates generally to improved methods and apparatus for generating a memory address in a data processing system and more particularly to improved methods and apparatus for generating a relatively large virtual or logical address in a data processing system employing virtual or mapped data storage. The most direct approach to generating a large address is to provide a data processor having sufficiently wide data paths to accommodate all of the bits of the address. However, the hardware required for such an approach would be quite expensive.

Another known approach is to provide relatively narrow data paths in the data processor and to then provide for making multiple passes of these narrow data paths in order to manipulate addresses wider than the data paths. The difficulty with this multiple pass approach is that the requirement for these multiple passes results in a significant slow-down in operating speed.

One way of overcoming the disadvantages of the multiple pass approach summarized above is disclosed in U.S. Pat. No. 4,251,860 issued Feb. 17, 1981, G. R. Mitchell et al., inventors. In this patent, an embodiment is disclosed which permits the use of relatively narrow data widths while avoiding the need for multiple passes in order to produce a large virtual address. This is accomplished by splitting the base address registers which contain the data that is used to form the virtual address into segment registers and offset registers. Then, opertion is provided so that only the offset portion of a selected base address is required to participate in arithmetic operations in order to form a virtual address, thereby permitting narrow data paths to be used even though the generated virtual address is much wider.

Additional background information regarding addressing techniques can be found in U.S. Pat. No. 4,240,139, issued Dec. 16, 1980; in the article "Indexed Mapping Extends Microprocessor Addressing Range", Ian LeMair, *Computer Design*, August 1980, pp. 111-118; in the article "Storage Relocation Translator", P. L. Martinez, *IBM Technical Disclosure Bulletin*, Vol. 23, No. 5, October 1980, pp. 1785-1789; in the article "Relocation Translator Address Bit Scheme", P. L. Martinez, IBM Technical Disclosure Bulletin, Vol. 23, No. 6, November 1980, pp. 2199 and 2200; and in the references cited in the above patent and articles.

SUMMARY OF THE INVENTION

In a preferred embodiment of the present invention, a generally similar approach is employed as is disclosed in the aforementioned U.S. Pat. No. 4,251,860 for permitting narrow data paths to be used for generating a much wider address without the need for multiple passes. However, the present invention goes significantly farther in providing very much more flexible and versatile address generating capabilities in a relatively simple and inexpensive manner.

Briefly, in a preferred embodiment of the invention, these added capabilities are achieved by employing indexing in a unique dual-purpose manner to provide a dimension override addressing option which permits a program to generate addresses which are able to access very large data structures outside of the normally available addressing range of the program.

The specific nature of the invention as well as other features, advantages, objects, and uses of the invention will become apparent from the following detailed description taken in conjunction with the accompanying drawings.

DETAILED DESCRIPTION OF THE INVENTION

Like numerals and characters represent like elements throughout the figures of the drawings.

In prior art virtual or logical address systems, such as disclosed in the aforementioned U.S. Pat. No. 4,251,860, it is typical to consider memory storage as being divided into identifiable regions commonly referred to as blocks or segments. These segments are typically referenced by a two-part logical address, the first part identifying a particular one of the segments, and the second part identifying an offset within the segment.

In the embodiment disclosed in the aforementioned U.S. Pat. No. 4,251,860, the generation of a virtual address from an instruction involves the use of a base register field provided by the instruction to select a base address comprised of segment and offset values which are split up into separate segment and offset registers, these segment and offset values together constituting the selected base address. A displacement field which is also provided by the instruction is then added to the value contained in the selected offset register to provide a resultant offset value which is concatenated with the segment portion of the base address contained in the selected segment register to form the desired virtual address. Since only the offset portion of the selected base address need be added to the displacement field to form the virtual address, much narrower data paths are required than would otherwise be possible.

Although the virtual address generation approach disclosed in the aforementioned U.S. Pat. No. 4,251,860 permits a large virtual address to be generated using relatively narrow data paths, it will be evident that the virtual address which can be generated by an instruction is limited to the adding of the instruction's displacement field to a particular base address selected by the instruction's base register field. If an overflow is detected, indicating that the resulting address encroaches on the next segment, the operation is aborted. It will thus be understood that the address range which each instruction can access using the approach disclosed in U.S. Pat. No. 4,251,860 is limited to a single segment. The preferred embodiment of the present invention illustrated in FIG. 1 maintains the narrow data path advantages of U.S. Pat. No. 4,251,860 while, on the other hand, making it possible for the same instruction to generate addresses capable of accessing data in a plurality of different segments, as will become evident from the description which follows.

Figure 1:
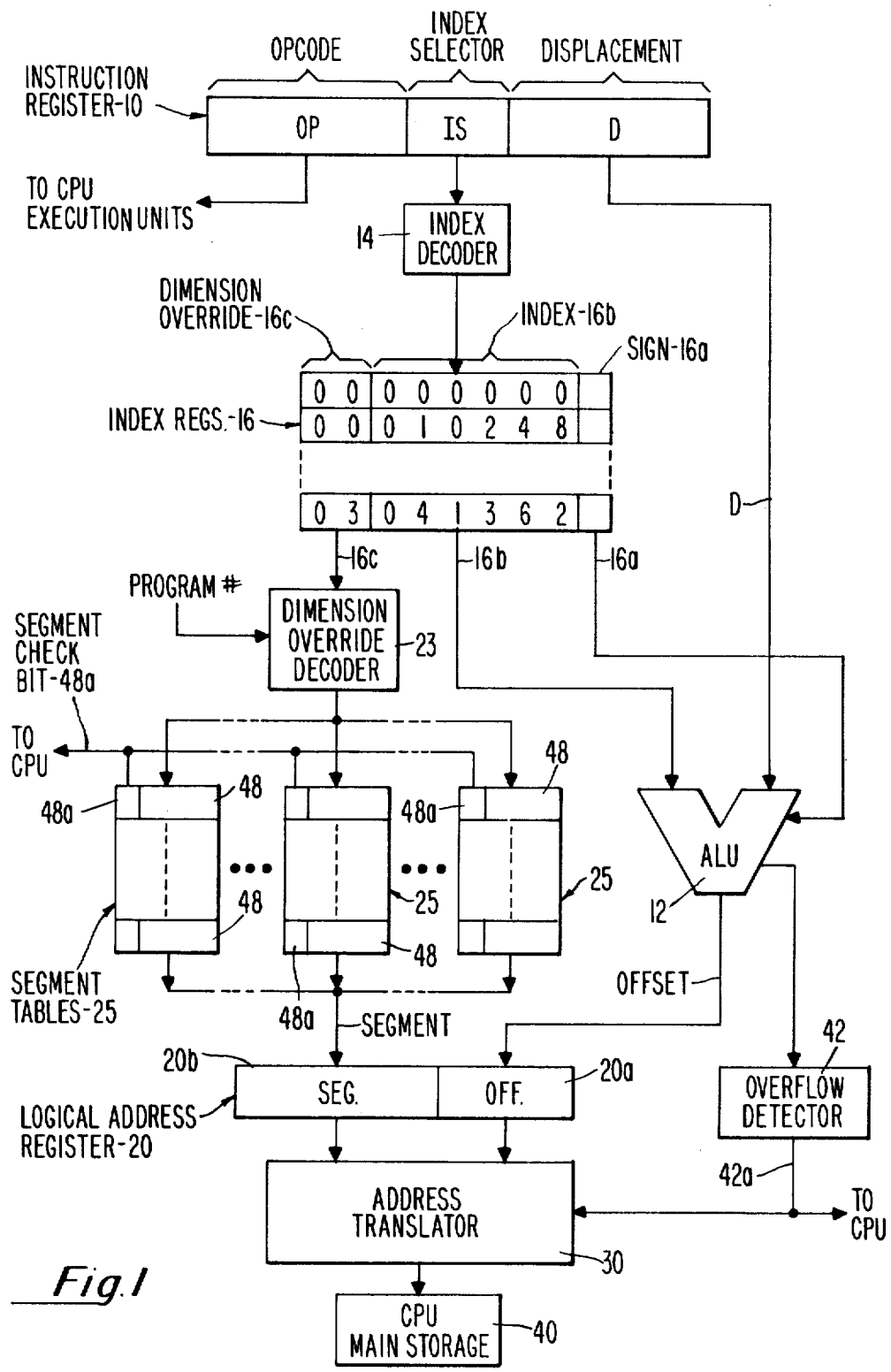
FIG. 1 is a block and schematic diagram illustrating a preferred embodiment of the invention.

Thus, referring to FIG. 1, it will be understood that, as typically occurs during data processing operations, an instruction to be processed is fetched and placed in an instruction register 10. As shown, a typical instruction includes an opcode OP which designates the operation to be performed, and an address portion comprised of an index selector IS and a displacement D which, as will be described hereinafter, together cooperate in the generation of a virtual or logical address. Typically, the opcode OP is sent to the data processor's execution unit (not shown) for performance of the operation designated by the opcode on the data in memory corresponding to the generated address. The particular manner in which such execution may be performed is not part of the present invention.

Still with reference to FIG. 1, it will be seen that the displacement D of the instruction in the instruction register 10 is applied to the right input of an arithmetic and logic unit (ALU) 12, while the index selector IS is applied to an index decoder 14 whose output selects a particular one of a plurality of index registers 16. As indicated in FIG. 1, the data contained in each of the index registers 16 comprises a sign portion 16a, an index portion 16b, and a dimension override portion 16c. The index portion 16b is applied to the left input of the ALU 12 and the sign portion 16a is applied to a sign input of the ALU which determines whether the index portion 16b is to be added or subtracted from the displacement D. The resulting output of the ALU 12 is the offset value of the desired virtual or logical address and is loaded into the offset portion 20a of a logical address register 20.

The dimension override portion 16c of the particular one of the index registers 16 in FIG. 1 selected by the index decoder 14 is used to derive the segment which is loaded into the segment portion of the logical address register 20. More specifically, as will be understood from FIG. 1, the dimension override portion 16c of the selected index register is applied to a dimension override decoder 23 which also receives a program number signal indicative of a particular one of a plurality of programs being run by the processor. The program number causes this dimension override decoder 23 to select a particular one of a plurality of segment tables 25 (one of each program being run), and the dimension override portion 16c causes the dimension override decoder 23 to select a particular segment entry 48 in the selected segment table. It will be understood that these segment tables 25 may be provided as part of the CPU's main storage or as separate hardware or firmware.

Each of the segment tables 25 in FIG. 1 includes a plurality of segment entries 48 designating the particular storage segments which its respective program will be permitted to access. Since one or more of these segments may be privileged and/or shared by other programs, each segment entry 48 includes a segment check bit 48a which is sent to the CPU to permit appropriate action to be taken in the event the selected segment is invalid or unavailable. Such action may, for example, include interrupting the program until the selected segment becomes available.

Assuming that the segment check bit 48a indicates that the selected segment entry 48 in the selected segment table 25 is valid and available, the dimension override decoder 23 then causes this selected segment entry 48 to be read out into the segment portion 20b of the logical address register 20. The concatenated offset and segment entry in the respective offset and segment portions of the logical address register 20 thus constitute the full logical address which is applied to an address translator 30 (which may be of conventional form) for translation or mapping into a physical address which is then applied to the CPU main storage 40.

Still with reference to FIG. 1, an overflow detector 42 serves to provide an overflow signal 42a if an overflow should result from the addition by the ALU 12 of the displacement D in the instruction register 10 and the offset portion 16b of the selected index register 16. This overflow signal 42a indicates that an offset overflow into another segment has occurred. Accordingly, as illustrated in FIG. 1, the overflow signal 42a is applied to the address translator 30 and to the CPU to abort the translation. Alternatively, the overflow could be ignored and the translation performed as if no overflow had occurred.

The versatility and flexibility of the address generation approach of the present invention will now be demonstrated with reference to the examples illustrated in FIGS. 2-7 along with FIG. 1. For these examples, it will be assumed that the selected segment entry loaded into the segment portion 20b of the logical address register corresponds to the base address of a segment, that the offset loaded into the offset portion 20a is the offset within this segment, and that the address translator 30 concatenates these portions 20a and 20b to obtain the real address in the CPU main storage 40. However, it is to be understood that the present invention is also applicable for use with other types of address translation techniques for deriving a real address in response to the contents of portions 20a and 20b.

Figure 2:
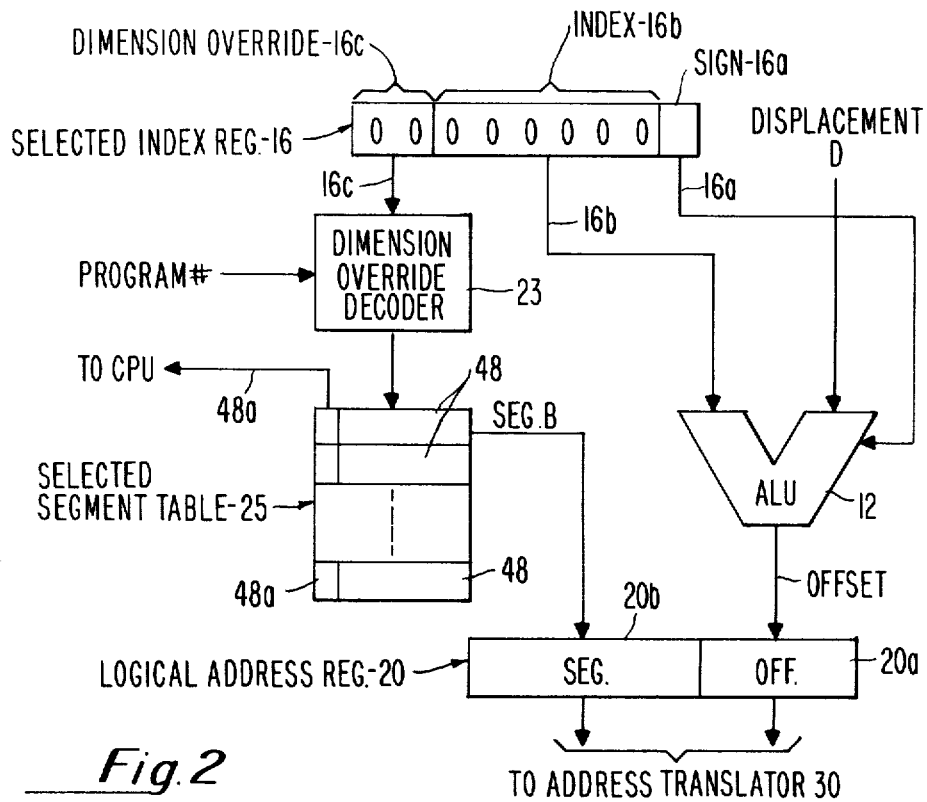
FIG. 2 illustrates an example of the operation of FIG. 1 wherein neither indexing nor dimension override are provided.
Figure 3:
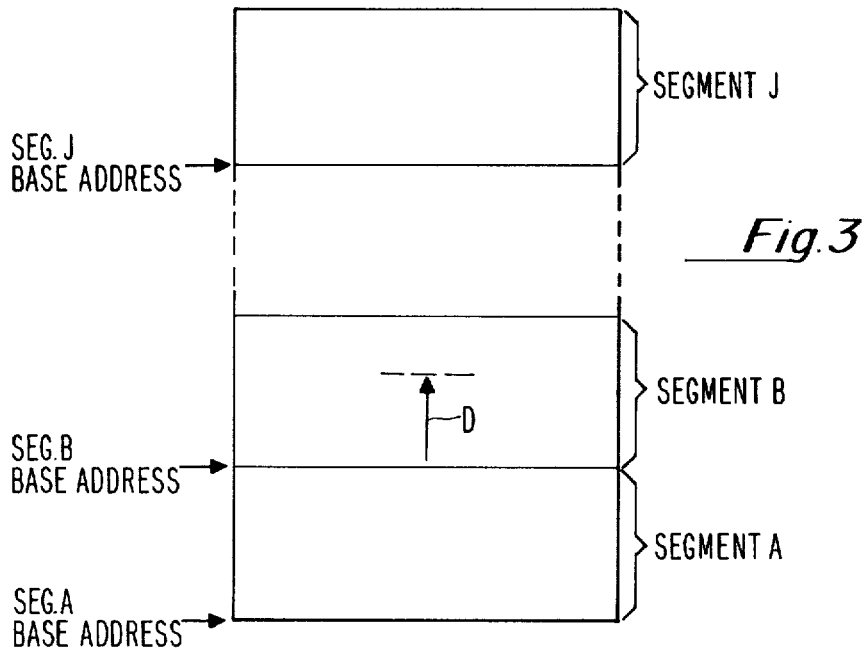
FIG. 3 is a graphical representation illustrating the results of the example of FIG. 2.

FIGS. 2 and 3 illustrate an example where neither indexing nor dimension override is called for by an instruction, as indicated by both the index portion 16b and the dimension override portion 16c of the selected index register 16 (selected by the index selector IS in the instruction register 10 in FIG. 1) being all zeroes. Typically, each index register 16 may provide for the storage of eight binary coded decimal digits in addition to a sign bit 16a, wherein the six most significant digits constitute the index portion 16b and the two most significant digits constitute the dimension override portion 16c. For the all zero value of the selected index register illustrated in FIG. 2, the resulting offset loaded into the offset portion of the logical address register 20 is merely the displacement D in the instruction register 10 in FIG. 1, while the all zero value of the dimension override portion 16c selects (via the dimension override decoder 23) the first entry in the segment table 25 corresponding to the current program number. This first entry, which is loaded into the segment portion of the logical address register 20, is translated by the address translator 30 into the base address of segment B which will be assumed to be assigned to the current program. The resulting address in segment B is diagramatically illustrated in FIG. 3. When no indexing is called for, the sign portion 16a of the selected index register 16 is ordinarily positive so that the selected address remains in segment B.

Figure 4:
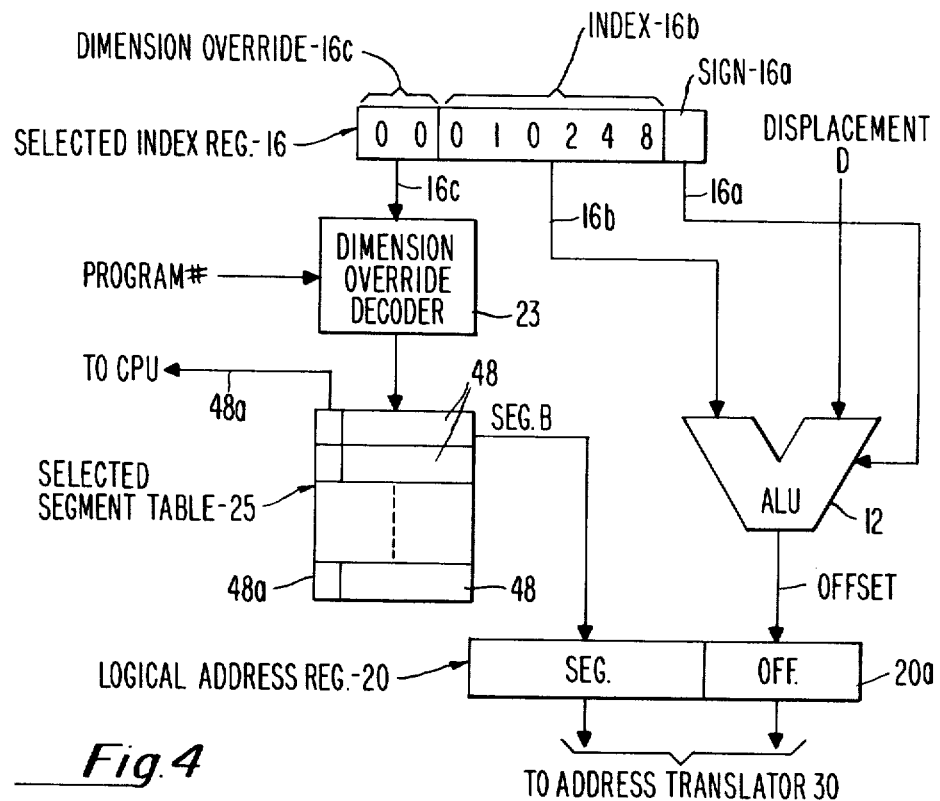
FIG. 4 illustrates an example of the operation of FIG. 1 wherein indexing is provided without dimension override.
Figure 5:
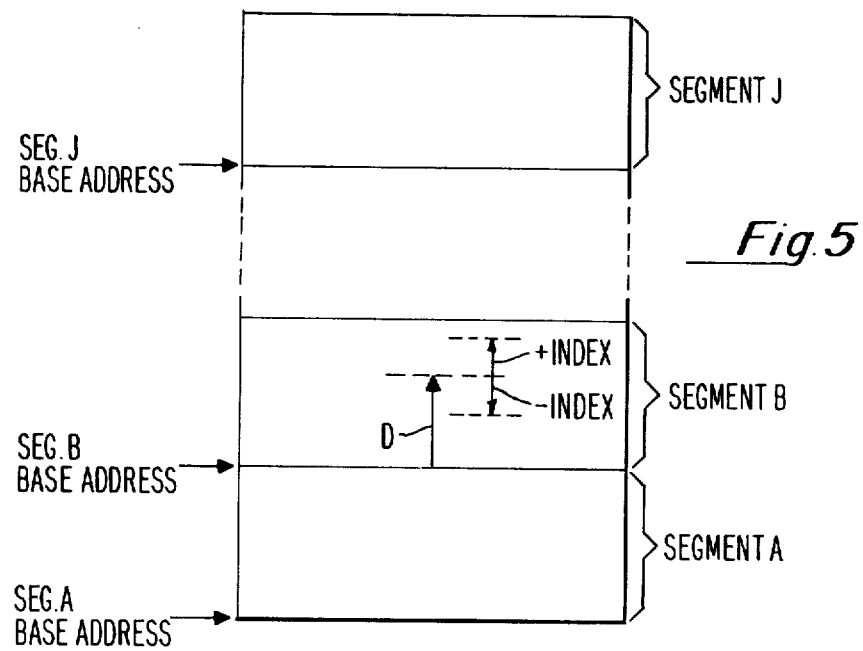
FIG. 5 is a graphical representation illustrating the results of the example of FIG. 4.

Considering next the example shown in FIGS. 4 and 5, this example illustrates a situation where indexing is being called for without dimension override, as indicated by the index portion 16b of the selected index register 16 being non-zero while the dimension override portion 16 remains all zeroes. Accordingly, the first entry of the segment table 25 is again selected causing the segment B base register address to again be loaded into the segment portion of the logical address register 20 so as to again point to the segment B base address. However, for this example, the offset loaded into the offset portion 20a of the logical address register 20 is now the ALU sum of the displacement D from the instruction register 10 (FIG. 1) and the index portion 16b from the selected index register taking into account the polarity of the sign 16a. Typical resulting addresses for both polarities of the sign 16a are illustrated in FIG. 5.

Figure 6:
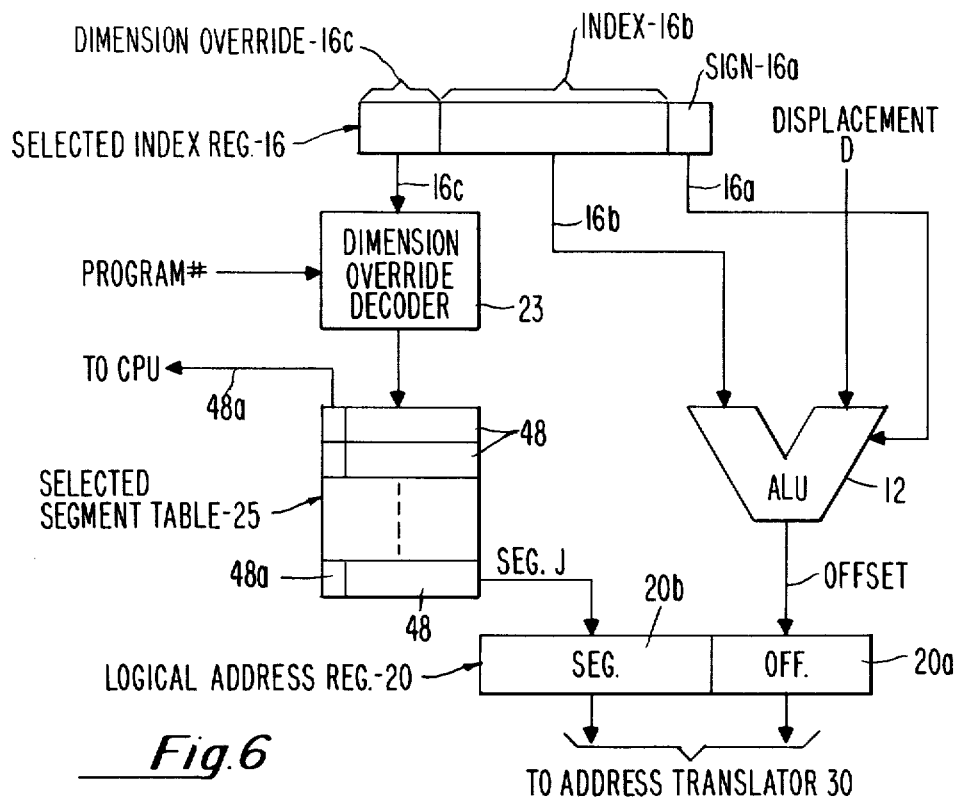
FIG. 6 illustrates an example of the operation of FIG. 1 wherein both indexing and dimension override are provided.
Figure 7:
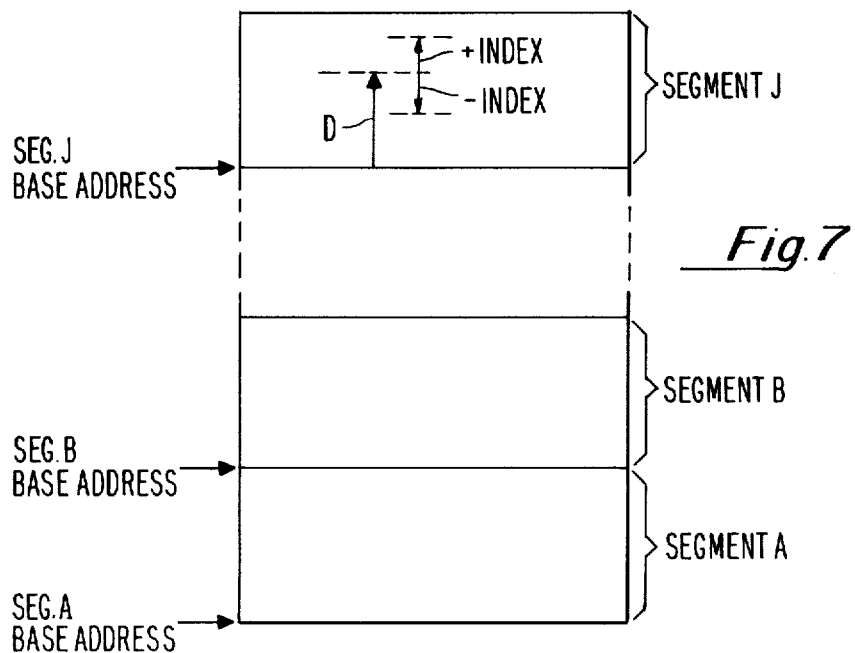
FIG. 7 is a graphical representation illustrating the results of the example of FIG. 6.

The last example to be considered is shown in FIGS. 6 and 7 and illustrates the situation where both indexing and dimension override are being called for, as indicated by both the index and dimension override portions 16b and 16c, respectively, being non-zero. The "03" dimension override portion 16c now selects the third entry in the segment table 25 which results in this third entry, corresponding, for example, to the base address of segment J, being loaded into the segment portion 20b of the logical address register 20. This segment J may, for example, contain a portion of a large table or other large data structure which is shared by a number of programs and which is too large for inclusion in any one of a program's assigned segment. Typical resulting logical addresses in segment J are illustrated in FIG. 7. Of course, if the check bit 48a of the selected entry indicates that the selected segment entry is invalid or unavailable, then the CPU will abort the operation, which may be accomplished in a conventional manner.

Although the present invention has been described in connection with a particular illustrative embodiment, it will be understood that many variations in construction, arrangement and use are possible within the scope of the invention. For example, the present invention is applicable for use with mapped memory as well as virtual memory and to various types of memory organizations.

The present invention is thus to be considered as including all possible modifications and variations encompassed within the scope of the appended claims.

What is claimed is:

1. In a data processing system having a memory and an address translator, improved apparatus for generating a logical address for use by said translator in accessing said memory, said apparatus comprising:
   means for storing data indicative of a logical address, said data including index selection data and displacement data;
   a plurality of index registers each including index data and address override data;
   means responsive to said index selection data for selecting one of said index registers;
   a logical address register having first and second portions;
   means including an adder for adding the index data in a selected index register to said displacement data and for storing the result in said first portion of said logical address register;
   table storing means for storing a plurality of tables each containing a plurality of address locating entries for a corresponding one of a plurality of programs performable by said system;
   selection means responsive to a program identification signal provided by said system and to said address data in a selected index register for accessing a corresponding one of the address locating entries in a selected one of said tables and for storing this accessed entry in said second portion of said logical address register; and
   means for applying the contents of the first and second portions of said logical address register to said address translator.

2. The invention in accordance with claim 1, wherein said means for storing data indicative of a logical address is an instruction register additionally containing operation data indicating a type of operation to be performed on data located at said logical address.

3. The invention in accordance with claim 1 or 2, wherein said index register also includes sign data, and wherein said adder means is responsive to said sign data for determining whether the index data in a selected index register is to be added to or subtracted from said displacement.

4. The invention in accordance with claim 1 or 2, wherein said memory includes a plurality of segments, and wherein each data locating entry in a table is indicative of the base address of a particular segment.

5. the invention in accordance with claim 4, wherein a table corresponding to a program includes address locating entries corresponding to the base addresses of segments assigned to the program, and wherein the table also includes at least one address locating entry corresponding to the base address of a segment which is shared with another program.

6. The invention in accordance with claim 5, wherein each address locating entry includes check data indicating the status thereof.

7. The invention in accordance with claim 4, wherein the sum of said displacement and the index data in a selected index register determines the resultant location accessed in the segment indicated by the selected address locating entry.

8. The invention in accordance with claim 7, wherein overflow detecting means are provided for detecting when the sum of said displacement and the index data in a selected index register designates a location which is outside of the segment whose base address is indicated by a selected address locating entry, and means responsive to said overflow detecting means to said system for taking corrective action when an overflow is detected.

* * * * *

UNITED STATES PATENT AND TRADEMARK OFFICE
CERTIFICATE OF CORRECTION

PATENT NO. : 4,432,053

DATED : February 14, 1984

INVENTOR(S) : Blaine D. Gaither, et al

It is certified that error appears in the above-identified patent and that said Letters Patent is hereby corrected as shown below:

Column 3, line 53, "of" should read -- for --.

Signed and Sealed this

Eighth Day of May 1984

[SEAL]

Attest:

Attesting Officer

GERALD J. MOSSINGHOFF

Commissioner of Patents and Trademarks